UNITED STATES PATENT OFFICE.

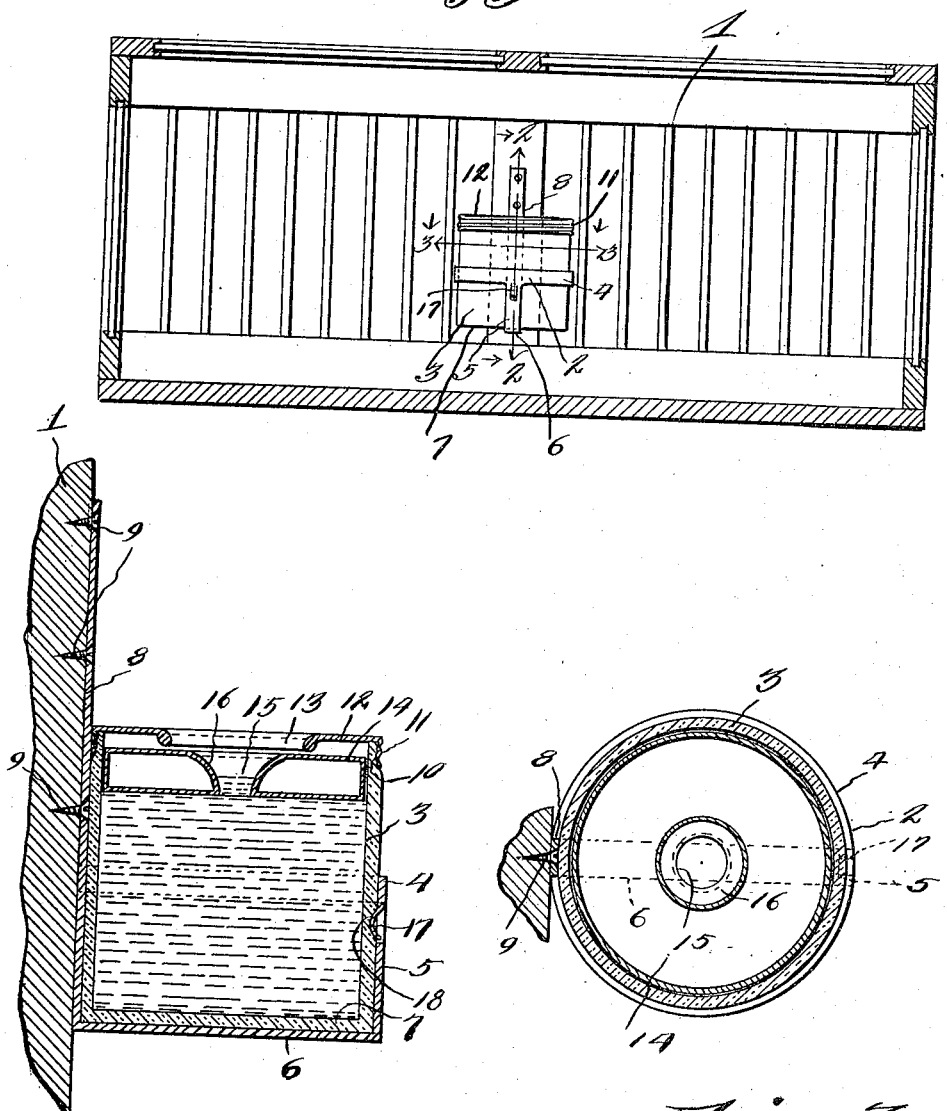

HARRY SCOTT, OF HAMILL, SOUTH DAKOTA.

POULTRY-FOUNTAIN FOR CHICKEN-COOPS.

1,215,417.  Specification of Letters Patent.  Patented Feb. 13, 1917.

Application filed November 2, 1916. Serial No. 129,120.

*To all whom it may concern:*

Be it known that I, HARRY SCOTT, a citizen of the United States, residing at Hamill, in the county of Tripp, State of South Dakota, have invented a new and useful Poultry-Fountain for Chicken-Coops; and I do hereby declare the following to be a full, clear, and exact description of the invention, such as will enable others skilled in the art to which it appertains to make and use the same.

This invention relates to an improved poultry fountain adapted particularly for use in connection with chicken coops and the like, and one of the objects of the invention is to provide a holder for the water receptacle or fountain, whereby the receptacle or fountain may be fastened to the side of the coop.

A further object of the invention is to provide means to prevent the water from splashing, as it is consumed by the poultry.

In practical fields, the details of construction may necessitate alterations falling within the scope of what is claimed.

The invention comprises further features and combinations of parts, as hereinafter set forth, shown in the drawings, and claimed.

In the drawings:—

Figure 1 is a view of a chicken coop partly in section and partly in elevation, showing the poultry fountain as applied thereto in elevation.

Fig. 2 is a sectional view on line 2—2 of Fig. 1.

Fig. 3 is a sectional view on line 3—3 of Fig. 1.

Referring more especially to the drawings, 1 designates a chicken coop, which may be of any suitable construction or contour, and 2 denotes a supporting frame for the poultry drinking fountain 3. This frame 2 consists of an annular band 4 integrally with which a U-shaped strip 5 is constructed, so that the lower transverse part 6 of the strip will engage and support the fountain or receptacle 3, by the transverse part 6 extending under the bottom 7 of the receptacle or fountain. The band 4 is provided with an upstanding arm 8, which is secured by screws 9 to the inner face of one of the longitudinal sides of the coop 1. The fountain or receptacle 3 upon its outer cylindrical surface near the top is provided with threads 10, to be engaged by the threads of the flange 11 of the top 12. This top 12 is provided with a flanged opening 13, through which the fowls may insert their heads to drink of the water in the fountain or receptacle. A hollow circular float 14, rectangular in cross section, is arranged in the receptacle or fountain 3 upon the water, through the central opening 15 of which the heads of the fowls may be inserted, so as to drink the water. It is to be noted that the wall 16 of the opening 15 is conical, in other words, extends downwardly and inwardly, so that the lower part of the opening 15 is smaller than the upper part, so that substantially only one bill at a time may be admitted, in order to reach and drink of the water or other fluid in the receptacle or fountain 3. The float with its restricted cone shaped opening arranged in the receptacle, as shown in the drawings, prevents the water or other fluid from excessive splashing. The forward arm of the U-shaped strip 5 has a spring clasp or catch 17 stamped or cut therefrom, to engage the depression in the wall of the receptacle 3 or fountain, thereby preventing upward displacement of said receptacle.

The invention having been set forth, what is claimed as new and useful, is:—

A poultry fountain comprising a receptacle having a cover threaded thereto, said cover having a central opening, and a hollow circular member to float upon the water in said receptacle below the cover, to prevent excessive splashing of the water as it is consumed, said float member having a central opening concentric with the opening of the cover, the wall of said opening of the float member tapering inwardly and downwardly, thereby being of a diameter less than the diameter of the upper part of said opening, to only permit a portion of the head of one fowl at a time to enter.

In testimony whereof I have signed my name to this specification in the presence of two subscribing witnesses.

HARRY SCOTT.

Witnesses:
 FRED PAINTER,
 ED. A. RUSSELL.

Copies of this patent may be obtained for five cents each, by addressing the "Commissioner of Patents, Washington, D. C."